United States Patent
Mishima et al.

(10) Patent No.: US 6,762,978 B2
(45) Date of Patent: Jul. 13, 2004

(54) OPTICAL HEAD SLIDER, METHOD FOR MANUFACTURING OPTICAL HEAD SLIDER, AND RECORDING AND/OR REPRODUCING APPARATUS

(75) Inventors: Akio Mishima, Kanagawa (JP); Kenjiro Watanabe, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/954,270

(22) Filed: Sep. 18, 2001

(65) Prior Publication Data

US 2002/0034129 A1 Mar. 21, 2002

(30) Foreign Application Priority Data

Sep. 18, 2000 (JP) ..................................... P2000-282685

(51) Int. Cl.$^7$ ............................................... G11B 11/00
(52) U.S. Cl. ............................... 369/13.32; 369/13.33; 369/112.23; 359/719
(58) Field of Search ....................................... 369/13.32

(56) References Cited

U.S. PATENT DOCUMENTS

| | | | | |
|---|---|---|---|---|
| 5,124,961 A | * | 6/1992 | Yamaguchi et al. | |
| 5,497,359 A | * | 3/1996 | Mamin et al. | 369/44.15 |
| 5,729,393 A | * | 3/1998 | Lee et al. | 359/819 |
| 6,055,222 A | * | 4/2000 | Knight | 369/112 |
| 6,243,350 B1 | * | 6/2001 | Knight et al. | 369/126 |
| 6,351,436 B1 | * | 2/2002 | Mallary | |
| 6,407,884 B1 | * | 6/2002 | Osborne et al. | 369/300 X |
| 6,522,617 B1 | * | 2/2003 | Berg et al. | 369/112.01 |
| 6,545,969 B1 | * | 4/2003 | Berg et al. | 369/112.23 |

* cited by examiner

Primary Examiner—Aristotelis M. Psitos
(74) Attorney, Agent, or Firm—Rader, Fishman & Grauer PLLC; Ronald P. Kananen (57) ABSTRACT

Recording/reproducing information signals to/from a recording medium appropriately even though the clearance from the signal recording surface of the recording medium to an optical head slider becomes significantly small. An optical head slider 10 includes a sliding member 11 which is floated and slides on a recording medium 4 at the time of recording/reproducing signals to/from the recording medium 4, a hemispheric objective lens 12 which is bonded to the sliding member 11, and a magnetic field generating means 16, which is mounted to the bottom of the sliding member 11 which faces the recording medium 4. The sliding member 11 is made of the same material as that of the optical lens 12, and a flat surface of the optical lens 12 is bonded to the top surface of the sliding member 11.

6 Claims, 5 Drawing Sheets

OPTICAL HEAD SLIDER, METHOD FOR MANUFACTURING OPTICAL HEAD SLIDER, AND RECORDING AND/OR REPRODUCING APPARATUS

BACKGROUND OF THE INVENTION

1. Field of the Invention

The present invention relates to an optical head slider for use in an optical head for recording/reproducing information signals to/from a recording medium such as an optical disc, a method for manufacturing the optical head slider, and a recording and/or reproducing apparatus for recording/reproducing information signals to/from a recording medium by the use of an optical head having the optical head slider.

2. Description of the Related Art

Up to now, there have been proposed optical discs, such as a magneto-optical disc and phase change type optical disc, to/from which information signals are recorded/reproduced by irradiating a beam to the signal recording surface thereof. So as to record many information signals to an optical disc to the utmost, attempts to enlarge recording density thereof have been made enthusiastically.

Along with the attempts to enlarge recording density of an optical disc, attempts to improve recording density have been made as to an optical pick up which records/reproduces information signals to/from an optical disc. That is, the optical pick up has reduced its spot size of a beam to be irradiated to the signal recording surface of an optical disc.

Especially, recently, the techniques of a floating type head slider of a hard disc drive have been employed to configure an optical head slider by mounting an optical lens to a sliding member. That is, there is proposed an optical head slider which is floated by a predetermined clearance and slides on the signal recording surface of an optical disc and whose optical lens condenses a beam led by an optical fiber to irradiate the condensed beam to the signal recording surface of an optical disc.

In case such an optical head slider is used in an optical disc drive, the clearance between the optical lens and the signal recording surface of an optical disc can significantly be reduced compared with that which does not use the optical head slider and irradiates a beam from an optical head to the signal recording surface of an optical disc. Thus, a lens of a high NA (numerical aperture) can be used, and the spot size of a beam to be irradiated to the signal recording surface of an optical disc can be reduced.

In the above-described optical disc drive, the optical lens is required to be unitedly mounted to the optical head slider such that the bottom of the optical lens is located at the bottom of the optical head slider which faces the optical disc. The optical lens is fixed at an opening provided at the optical head slider by undergoing glass fusion or adhesion using UV (ultraviolet) curing type organic adhesive.

Figure 1:
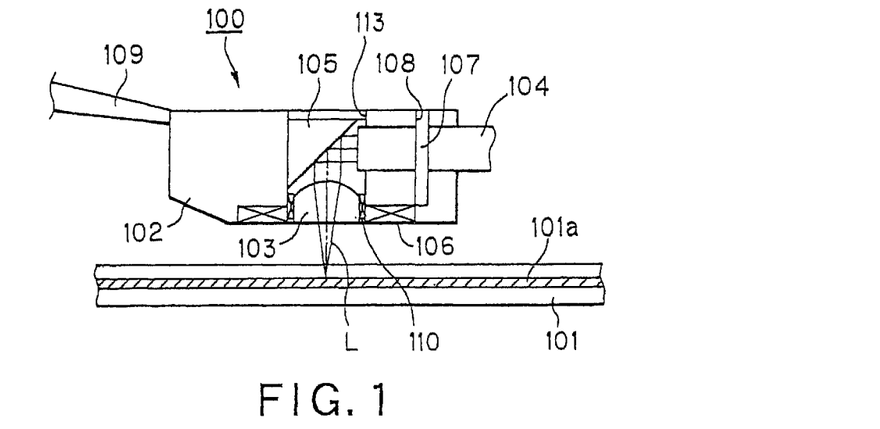
FIG. 1 shows a sectional view of a conventional optical head slider.

FIG. 1 shows a sectional view of a conventional optical head slider 100. As shown, the optical head slider 100 has a sliding member 102 which is floated and slides on the signal recording surface of a magneto-optical disc 101 at the time of recording/reproducing information signals to/from the magneto-optical disc 101, and an objective lens 103 which is fixed to the sliding member 102. The sliding member 102 has an optical fiber 104 and a deflection mirror 105 built therein. A laser beam L led by the optical fiber 104 falls on the objective lens 103 via the deflection mirror 105, and is condensed by the objective lens 103, and then falls on a signal recording layer 101a of the magneto-optical disc 101.

The sliding member 102 further has a thin-film coil 106 for applying a magnetic field to the magneto-optical disc 101 at the time of recording information signals, and a terminal 107 which is electrically connected to the thin-film coil 106. The thin-film coil 106 is so located at the lower part of the sliding member 102 facing the magneto-optical disc 101 as to wind around the objective lens 103 to form a thin film. On the other hand, the terminal 107 is formed by filling conductive material into an opening 108 which penetrates the sliding member 102 along the thickness direction thereof such that the end thereof is shared with the end of the thin-film coil 106.

The sliding member 102 is mounted to the end of a supporting arm 109 which is mounted to the optical disc drive. The laser beam L scans the signal recording surface of the rotated magneto-optical disc 101 when the supporting arm 109 is caused to pivot along the radial direction of the magneto-optical disc 101.

Thus configured optical bead slider 100 receives an airflow generated due to the rotation of the magneto-optical disc 101, and is floated by a predetermined clearance from the signal recording surface of the magneto-optical disc 101, while irradiating the laser beam L condensed by the objective lens 103 to the signal recording layer 101a of the magneto-optical disc 101 to record/reproduce information signals to/from the magneto-optical disc 101. When recording information signals, the thin-film coil 106 generates a magnetic field of a predetermined intensity, and applies the magnetic field to a portion of the signal recording layer 101a of the magneto-optical disc 101 to which the laser beam L is irradiated.

The optical head slider 100 is provided with an opening 113 which penetrates the sliding member 102 along the thickness direction thereof, and the objective lens 103 is fit into the opening 113 and fixed to the sliding member 102 by undergoing glass fusion or adhesion using UV (ultraviolet) curing type organic adhesive 110.

The lower part of the optical head slider 100 is made up of the lower part of the sliding member 102, objective lens 103, thin-film coil 106 and adhesive 110. So, at the time of polishing the bottom of the optical head slider 100, there are generated micro-irregularities being of the order of 100 nm to 200 nm due to the hardness difference between their materials.

In case of irradiating a beam of a reduced spot size to the magneto-optical disc 101 by the use of the high NA lens to enlarge recording density, the clearance between the optical head slider 100 and the signal recording surface of the magneto-optical disc 101 becomes significantly small. So, when dust is attached to the micro-irregularities of the floating surface or the bottom of the optical head slider 100, the magneto-optical disc 101 is caused to crash frequently due to the reduced clearance. Furthermore, the dust attached to the floating surface of the optical head slider 100 is burned, and such burned dust cannot be removed or cleaned up even though organic solvent is used.

OBJECT AND SUMMARY OF THE INVENTION

It is therefore an object of the present invention to overcome the above-mentioned drawbacks by providing an optical head slider of a high reliability which can appropriately record/reproduce information signals to/from a recording medium even though the clearance from the signal recording surface of the recording medium becomes significantly small and of a configuration which can facilitate the manufacturing thereof.

It is another object of the present invention to provide a method for manufacturing the optical head slider easily with high accuracy.

It is yet another object of the present invention to provide a recording and/or reproducing apparatus having an optical head using the optical head slider.

According to the present invention, there is provided an optical head slider including:

a sliding member which is floated and slides on a recording medium at the time of recording/reproducing signals to/from the recording medium;

an optical lens having a spherical surface and a flat surface, which is bonded to the sliding member; and means for generating a magnetic field, which is mounted to the bottom of the sliding member which faces the recording medium;

wherein the sliding member is made of the same material as that of the optical lens, and the flat surface of the optical lens is bonded to the top surface of the sliding member, so that a sum of a thickness of the optical lens and that of a basal plate becomes the radius of curvature of the spherical surface of the optical lens.

With the optical head slider, the optical lens and sliding member, made of the same material as that of the optical lens, are bonded to each other by the optical contact which does not raise optical problems, and the sliding member configures a part of the optical lens. Thus, the optical head can be manufactured easily and reduced in size.

According to the present invention, there is also provided a method for manufacturing an optical head slider including the steps of:

a first step of bonding an optical lens having a spherical surface and a flat surface to a basal plate which is to be an sliding member;

a second step of bonding a reinforcing block being provided with an opening into which the objective lens is fit to the basal plate;

a third step of polishing the bottom surface of the basal plate which faces the recording medium so that the sum of the thickness of the optical lens and that of the basal plate becomes the radius of curvature of the spherical surface of the optical lens;

a fourth step of polishing the top surface of the reinforcing block so that the sliding member becomes of a predetermined thickness; and a fifth step of cutting the basal plate into individual sliding members.

With the method for manufacturing an optical head slider, a plurality of optical lenses are positioned and arranged on the sliding member being made of the same material as that of the optical lenses, and the optical lenses and sliding member are so bonded by thermocompression bonding as to be united and optically uniform. Furthermore a plurality of reinforcing blocks each being provided with the opening into which the objective lens is fit are positioned and bonded to the sliding member, and the sliding member is polished so that the sum of the thickness of the optical lens and that of the sliding member becomes the radius of curvature of the spherical surface of the optical lens. Thus, a plurality of optical head sliders can be manufactured in one lot. That is, by undergoing above-described manufacturing process, the optical head slider reduced in size can be manufactured easily with high accuracy. With the manufacturing method, a large quantity of optical head sliders each of a stable quality can be manufactured, which can desirably reduce the manufacturing cost.

According to the present invention, there is also provided a recording and/or reproducing apparatus which has an optical head for recording/reproducing information signals to/from a recording medium, wherein the optical head has a head slider for scanning the rotated recording medium and an arm for supporting the head slider, the head slider has a sliding member which is floated and slides on the recording medium at the time of recording/reproducing signals to/from the recording medium, an optical lens which is bonded to the sliding member, and means for generating a magnetic field, which is mounted to the bottom of the sliding member which faces the recording medium, and the optical lens has a spherical surface and a flat surface.

With the recording and/or reproducing apparatus, the sliding member can appropriately record/reproduce information signals to/from a recording medium even though the size thereof is reduced.

These objects and other objects, features and advantages of the present invention will become more apparent from the following detailed description of the preferred embodiments of the present invention when taken in conjunction with the accompanying drawings.

DETAILED DESCRIPTION OF THE PREFERRED EMBODIMENTS

Preferred embodiments according to the present invention will further be described below with reference to the accompanying drawings.

Figure 2:
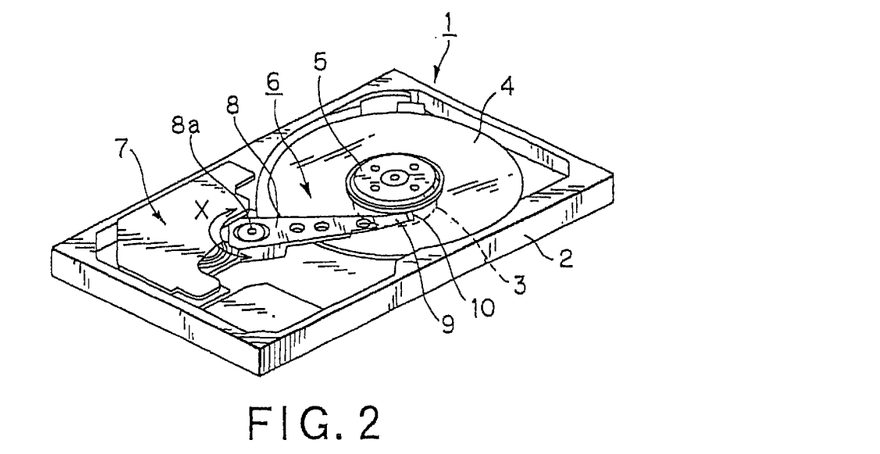
FIG. 2 shows a perspective view of an optical disc drive employing the present invention.

FIG. 2 shows a perspective view of an optical disc drive 1 employing the present invention. The optical disc drive 1 shown in FIG. 2 employs the techniques of a hard disc drive for use as a storing device of a personal computer, and so forth. As shown, the optical disc drive 1 has a housing 2 and a spindle motor 3 mounted thereto, and a magneto-optical disc 4 to/from which information signals are recorded/reproduced is installed to the spindle motor 3 and is fixed by a clamper 5. The magneto-optical disc 4 is rotated by the spindle motor 3 under the control of a controlling unit at a predetermined rotational frequency.

There is mounted an optical head device 6 to the housing 2 corresponding to a magnetic head device used in a hard disc drive. The optical head device 6 records/reproduces information signals to/from the magneto-optical disc 4 rotated by the spindle motor 3. The optical head device 6 has an arm 8 which is rotated by a voice coil motor 7, a head-supporting spring 9 which is unitedly mounted to the end of the arm 8, and a optical head slider 10 which is mounted to the end of the head-supporting spring 9.

The voice coil motor 7 consists of a voice coil which is mounted to the arm 8 and a pair of magnets which sandwich the voice coil. When a voltage is applied to the voice coil from outside, a current set up in the voice coil and a magnetic field formed by the magnets induce a driving force which causes the arm 8 and head-supporting spring 9 to pivot along a direction shown by an arrow X in FIG. 2 with a supporting axis 8a being the center of pivoting.

With the optical head device 6, when the arm 8 and head-supporting spring 9 are caused to pivot by the voice coil motor 7, the optical head slider 10 mounted to the end of the head-supporting spring 9 is moved along the radial direction of the magneto-optical disc 4 rotated by the spindle motor 3. Then, the optical head slider 10 receives an airflow generated due to the rotation of the magneto-optical disc 4, and is floated by a predetermined clearance from the magneto-optical disc 4 to scan the signal recording surface thereof.

Figure 3:
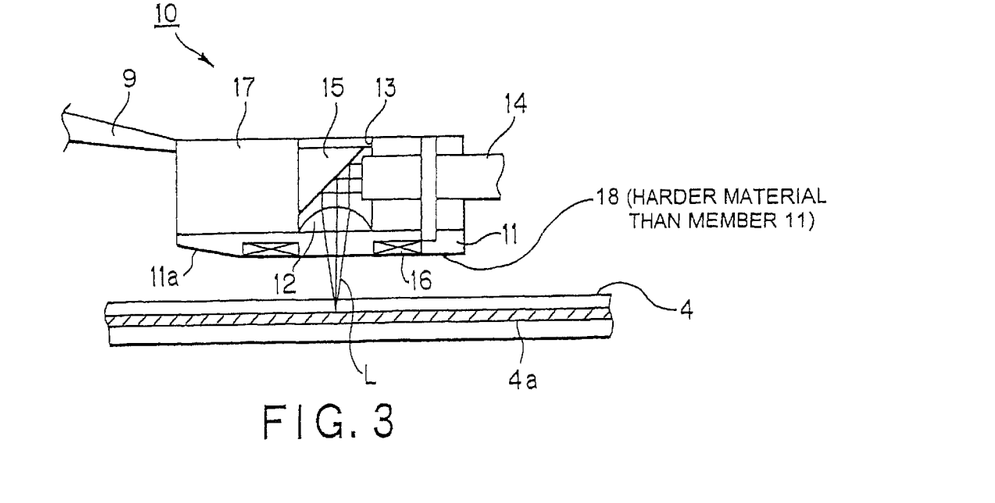
FIG. 3 shows a sectional view of an example of an optical head slider according to the present invention, which is mounted to the optical disc drive.

FIG. 3 shows a sectional view of an example of the optical head slider 10 of the optical head device 6. As shown, the optical head slider 10 has a sliding member 11 which is floated and slides on the signal recording surface of the magneto-optical disc 4 at the time of recording/reproducing information signals to/from the magneto-optical disc 4, and an objective lens 12 being a hemispheric lens which is mounted to the sliding member 11.

The sliding member 11 is substantially of a rectangular configuration and is made of optical material such as BK-7. The sliding member 11 is so supported at the end of the head-supporting spring 9 as to face the magneto-optical disc 4. There is formed a floatation-generating surface 11a for generating floating force when receiving an airflow generated due to the rotation of the magneto-optical disc 4 at the bottom surface of the sliding member 11 which faces the magneto-optical disc 4. The configuration of the floatation-generating surface 11a is not confined, and can be arbitrarily changed.

The sliding member 11 is bonded to a reinforcing block 17 which is provided with an opening 13 penetrating the block along the thickness direction thereof. The opening 13 has its diameter formed slightly larger than that of the objective lens 12.

The objective lens 12 condenses a laser beam L to be irradiated to a signal recording layer 4a formed on the signal recording surface of the magneto-optical disc 4 at the time of recording/reproducing information signals to/from the magneto-optical disc 4. The objective lens 12 is made of a material having a high optical transmittance in the wavelength range of the laser beam L and a high refractive index such as optical glass or optical plastic, and is formed substantially in a hemispheric shape unitedly with the sliding member 11. That is, the objective lens 12 has its bottom surface fused to be bonded to a predetermined position of the sliding member 11.

So, the objective lens 12 whose configuration is a part of a sphere and the sliding member 11 are bonded and united.

There is formed a durable protective film 18 which is made of a material having high hardness such as diamond-like carbon for preventing damages to be caused due to contacts with the magneto-optical disc 4 at the bottom of the sliding member 11 which faces the magneto-optical disc 4. The durable protective film 18 is configured to be of the order of 5 nm to 20 nm in thickness.

The sliding member 11 has an optical fiber 14 for leading the laser beam L irradiated from a semiconductor laser generator, not shown, to the objective lens 12 and a deflection mirror 15 built therein. The optical fiber 14 is mounted to the optical head slider 10 such that one end thereof faces the inside of the opening 13 from the side portion of the reinforcing block 17. The deflection mirror 15 is located at the inside of the opening 13 and deflects the laser beam L from the optical fiber 14 toward the objective lens 12.

So, in the optical head slider 10, the laser beam L led by the optical fiber 14 falls on the objective lens 12 via the deflection mirror 15, and is condensed by the objective lens 12, and then falls on the signal recording layer 4a of the magneto-optical disc 4.

Thus configured optical head slider 10 receives an airflow generated due to the rotation of the magneto-optical disc 4, and is floated by a predetermined clearance from the signal recording surface of the magneto-optical disc 4, while irradiating the laser beam L condensed by the objective lens 12 mounted to the sliding member 11 to the signal recording layer 4a of the magneto-optical disc 4 to record/reproduce information signals to/from the magneto-optical disc 4. When recording information signals, the thin-film coil 16 generates a magnetic field of a predetermined intensity, and applies the magnetic field to a portion of the signal recording layer 4a of the magneto-optical disc 4 to which the laser beam L is irradiated.

Figure 4:
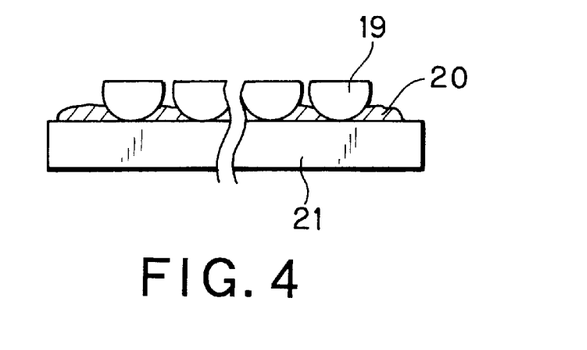
FIG. 4 shows a sectional view indicating a step of a process for manufacturing the optical head slider, in which a ball lens is polished to be a hemispheric lens.

Next, a method for manufacturing the optical head slider 10 according to the present invention will be explained by referring to an example of a manufacturing process. In manufacturing the optical head slider 10, at first, an amorphous ball which is made of such as "BK7", $SiO_2$, "LaSF", "TaF-3", "SF-8", $TiO_2$, or a compound semiconductor ball which is made of such as GaP, SiC, ZnS, ZnSe is prepared. This ball will be a part of above-described objective lens 12. A plurality of such balls are fixed on a polishing jig 21 by adhesive 20 such as pitch, and then the balls are polished, as shown in FIG. 4. This polishing operation is stopped immediately before the sum of the thickness of hemispheric lenses 19 and that of a basal plate 22, which will be described later, reaches the radius of curvature of the hemispheric lenses 19. At this time, the roughness of the polished surface should be not larger than approximately Rmax 10 nm.

Figure 5:
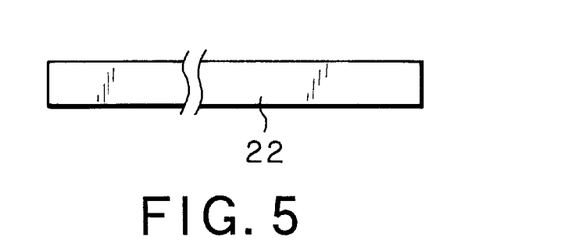
FIG. 5 shows a sectional view indicating a step of the process for manufacturing the optical head slider, in which a basal plate which is to be a sliding member is polished.

Also, a basal plate 22 which is made of the same material as that of the hemispheric lenses 19 is prepared, and the basal plate 22 is polished to be of a predetermined thickness, as shown in FIG. 5. At this time, the roughness of the polished surface should also be not larger than approximately Rmax 10 nm.

Figure 6:
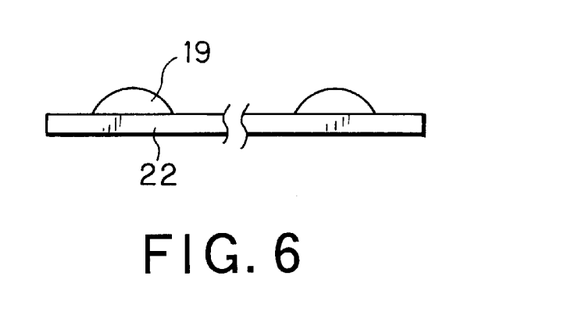
FIG. 6 shows a sectional view indicating a step of the process for manufacturing the optical head slider, in which the hemispheric lens is bonded to the basal plate by thermocompression bonding.

Next, the hemispheric lenses 19 are set on the basal plate 22 at predetermined positions, as shown in FIG. 6. Then, a pressure is applied and the basal plate 22 and hemispheric lenses 19 set thereon with pressure are put into an electric furnace. The atmosphere in the electric furnace is oxygen in case the hemispheric lenses 19 are made of Ti glass, atmosphere in case the hemispheric lenses 19 are made of glass other than Ti glass, and is vacuum in case the hemispheric lenses 19 are made of compound semiconductor. In the electric furnace, the temperature is raised between the transition point Tg and the submission point At to bond the hemispheric lenses 19 and basal plate 22 by thermocompression bonding. This is because the hemispheric lenses 19 and basal plate 22 are not bonded when the temperature is below the transition point Tg, and the hemispheric lenses 19 are deformed when the temperature is above the submission point At.

Figure 7:
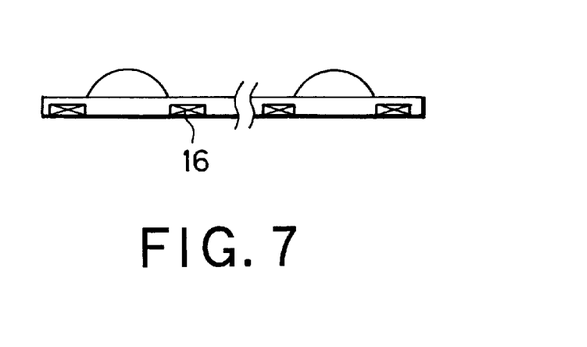
FIG. 7 shows a sectional view indicating a step of the process for manufacturing the optical head slider, in which a thin-film coil is formed at the basal plate.

Then, insulating films and copper films are alternately formed by the use of a mask pattern of a coil and etched to form the thin-film coil 16, as shown in FIG. 7. The insulating films are formed by sputtering $SiO_2$ and the copper films are formed by frame plating.

Figure 8:
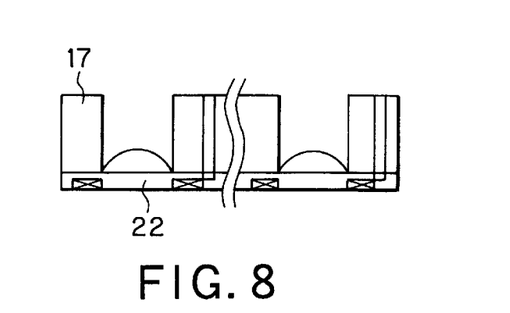
FIG. 8 shows a sectional view indicating a step of the process for manufacturing the optical head slider, in which a reinforcing block is bonded to the basal plate.

Then, reinforcing blocks 17 each of which is provided with an opening in advance are prepared, into which an objective lens will be fit. And, the reinforcing blocks 17 are set on the basal plate 22, as shown in FIG. 8. Then, a pressure is applied and the basal plate 22 and the reinforcing blocks 17 set thereon with pressure are put into the electric furnace. The atmosphere in the electric furnace is oxygen in case the basal plate 22 is made of Ti glass, atmosphere in case the basal plate 22 is made of glass other than Ti glass, and is vacuum in case the basal plate 22 is made of compound semiconductor. In the electric furnace, the temperature is raised between the transition point Tg and the submission point At to bond the reinforcing blocks 17 and basal plate 22 by thermocompression bonding. On the other hand, the reinforcing blocks 17 and basal plate 22 can be bonded using UV (ultraviolet) curing type adhesive.

Figure 9:
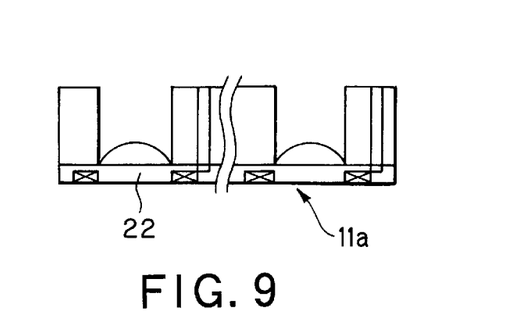
FIG. 9 shows a sectional view indicating a step of the process for manufacturing the optical head slider, in which the basal plate is polished so that the sum of the thickness of the hemispheric lens and that of the basal plate becomes the radius of curvature of the hemispheric lens.

Then, the bottom surface 11a which will face a magneto-optical disc is polished, as shown in FIG. 9. This polishing operation is performed until the sum of the thickness of the hemispheric lenses 19 and that of the basal plate 22 reaches the radius of curvature of the hemispheric lenses 19.

At first, the thicknesses of the hemispheric lenses 19 and that of the basal plate 22 are measured by a length measuring machine having a magnetic or optical scale built therein. Finally, it is ascertained that the sum of the thickness of the objective lens 12 and that of the sliding member 11 equals the radius of curvature of the objective lens 12 by the use of an interferometer for measuring lens thickness, as shown in FIG. 13.

Figure 13:
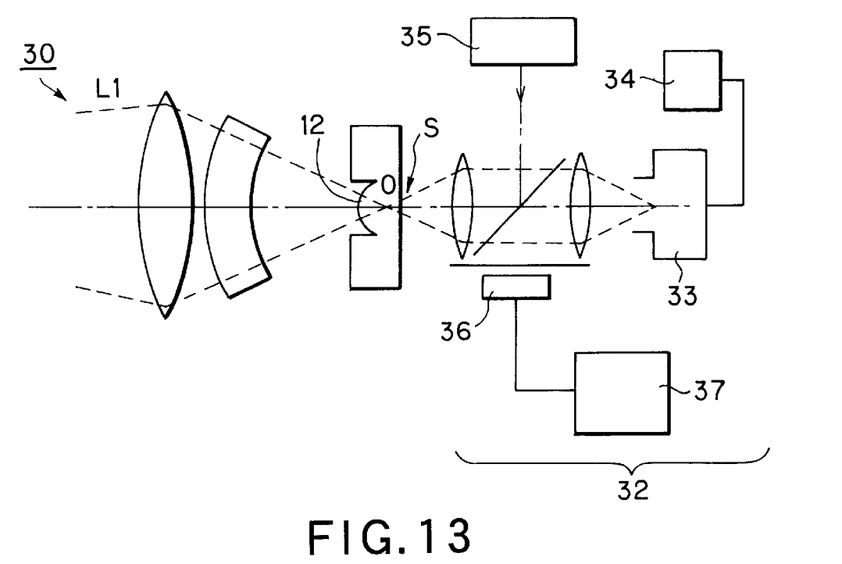
FIG. 13 shows the configuration of an optical length measuring machine for measuring the thicknesses of the hemispheric lens employing a Fizeau interferometer.

FIG. 13 shows the configuration of an optical length measuring machine employing a Fizeau interferometer 30. When lens thickness is measured by the Fizeau interferometer 30, a laser beam L1 is irradiated to the objective lens 12 perpendicular to the surface thereof. The laser beam L1 is to made pass through the objective lens 12 to form a spot at the optical center thereof.

Then the spot is monitored by the use of a CCD camera 33 for picking up images, which is located at an eyepiece unit of a length-measuring unit 32, and a TV monitor 34 for monitoring images picked up by the CCD camera 33, and then the spot is caused to coincide with a focus position O of the CCD camera 33. Next, an illuminator 35 is turned on, and then the CCD camera 33 is focused on the polished surface S. At this time, the CCD camera 33 is moved, and the moved length of the CCD camera 33 is the length which is required to be polished. So, the polishing is performed until the spot and polishing surface S coincide with each other.

Figure 10:
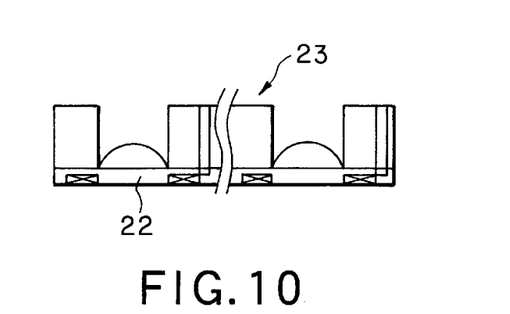
FIG. 10 shows a sectional view indicating a step of the process for manufacturing the optical head slider, in which the reinforcing block is polished so that the sum of the thickness of the reinforcing block and that of the basal plate becomes of a predetermined thickness.

Next, the top surfaces of the optical head sliders 10 or top surfaces 23 of the reinforcing blocks 17 shown in FIG. 10 are polished so that each optical head slider 10 becomes of a predetermined slider thickness.

Figure 14:
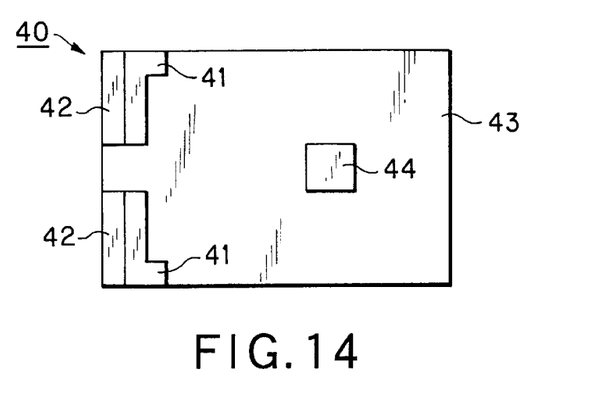
FIG. 14 shows the facing surface of the optical head slider which faces a magneto-optical disc.

The wafer having the basal plate 22 and reinforcing blocks 17 bonded thereto forms the ABS (Air Bearing Surface) being a pattern of a predetermined shape on the thin-film coil surface. FIG. 14 shows an example of the pattern. The facing surface of the optical head slider 10 which faces the magneto-optical disc 4 is composed of rail surfaces 41, front steps 42, a negative pressure groove 43, and a center island 44. The rail surfaces 41 and center island 44 are protrusions, and are of the same height. The front steps 42 and negative pressure groove 43 are lowered in height from the rail surfaces 41 by 0.35 μm and 3 μm, respectively.

Figure 11:
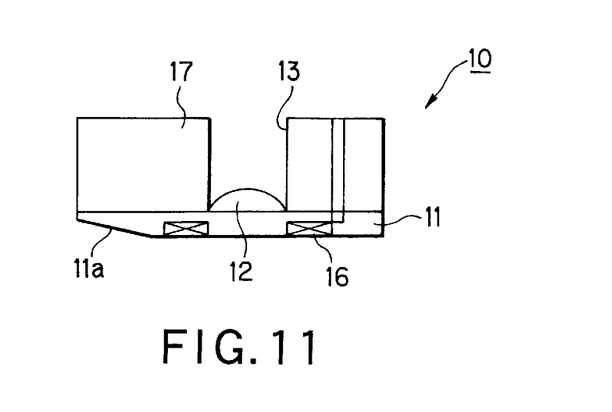
FIG. 11 shows a sectional view indicating a step of the process for manufacturing the optical head slider, in which the wafer is cut into individual optical head sliders after forming the ABS.

The wafer has its ABS coated with a durable protective film made of DLC (diamond-like carbon) by a vacuum film-forming apparatus for performing sputtering, and then is cut into individual optical head sliders 10 each of which is shown in FIG. 11.

Figure 12:
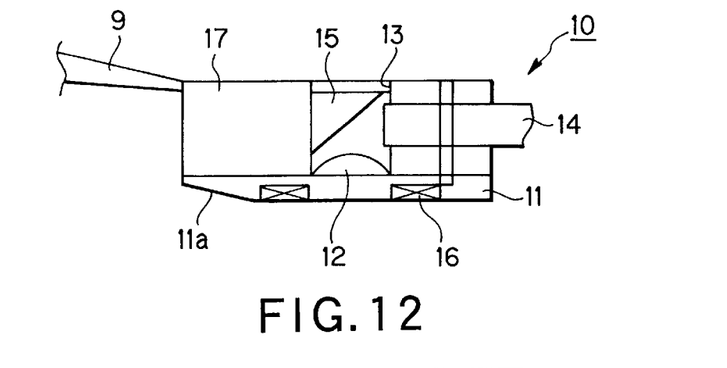
FIG. 12 shows a sectional view indicating a step of the process for manufacturing the optical head slider, in which a mirror, a fiber and a gimbal are mounted to the optical head slider, and the optical head slider is completed.

Next, a mirror, a fiber and a gimbal are mounted to each optical head slider 10. Thus, the optical head slider 10 shown in FIG. 12 is completed.

Thus, the optical head slider 10 of a small size can be manufactured easily with high accuracy by undergoing above-described manufacturing process. With the manufacturing method, a large quantity of optical head sliders 10 each of a stable quality can be manufactured, which can desirably reduce the manufacturing cost.

Figure 15:
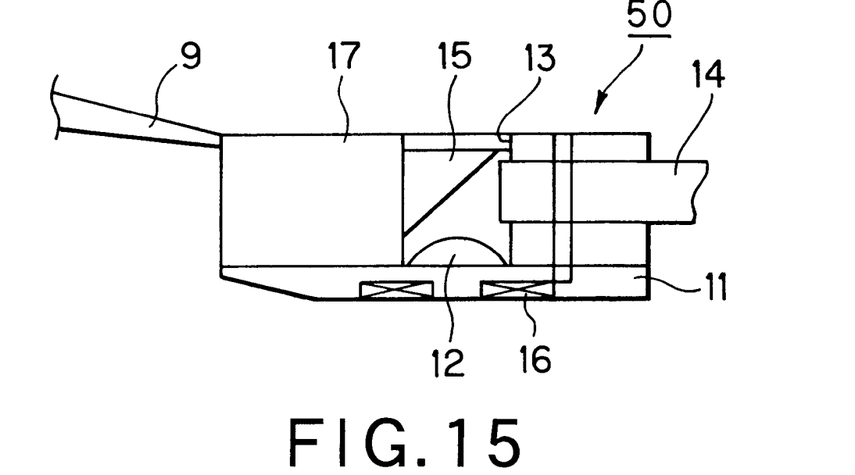
FIG. 15 shows a sectional view of another example of the optical head slider in which the inside diameter of the thin-film coil is smaller than the outside diameter of the hemispheric lens.

FIG. 15 shows a sectional view of another example of the optical head slider 50. The optical head slider 50 has the inside diameter of the thin-film coil 16 reduced and made smaller than the outside diameter of the objective lens 12. In this case, the laser beam L is made pass through the center of the objective lens, and heat generated at the spot lowers the coercive force Hc of the signal recording layer of the magneto-optical disc 4, which allows recording information signals to be recorded to the magneto-optical disc 4 with a slight magnetic field generated by the thin-film coil 16. Also, the smaller the inside diameter of the thin-film coil 16 is, the larger the magnetic field around the center of the thin-film coil 16 becomes, which allows recording information signals to be recorded to the magneto-optical disc 4 with a slight recording current. In case the recording current is reduced, deformation of the optical head slider 10 due to heat generated by the thin-film coil 16 is not raised so much, which can realize stable floating.

Figure 16:
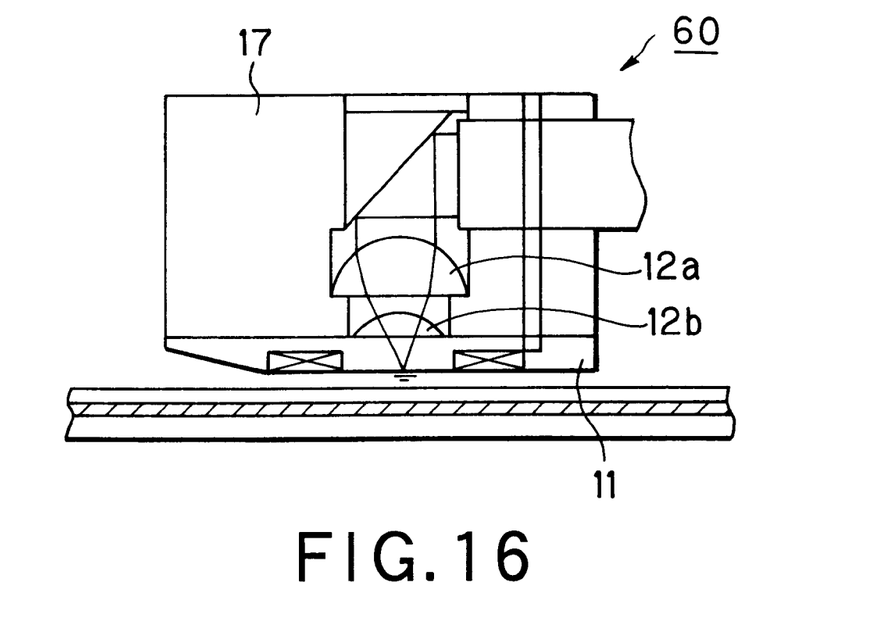
FIG. 16 shows a sectional view of another example of the optical head slider in which an objective lens and an SIL are combined to record information signals by the near-field recording.

FIG. 16 shows a sectional view of yet another example of the optical head slider 60. The optical head slider 60 is floated by keeping the microscopic clearance from the signal recording surface of the magneto-optical disc 4, while recording information signals to the magneto-optical disc 4 by the near-field recording using near-field beam.

The optical head slider 60 has an objective lens 12a and an SIL (Solid Immersion Lens) 12b which is located under the objective lens 12a. The SIL 12b is an optical glass made of a material having a high refractive index such as GaP, and is formed substantially in a hemispheric shape and is bonded to the sliding member 11, which is also made of GaP, by the optical contact.

The objective lens 12a is bonded to the reinforcing block 17 by the optical contact described with reference to FIG. 6. The objective lens 12a may be bonded to the reinforcing block 17 using UV (ultraviolet) curing type organic adhesive.

As has been described hereinbefore, with the optical head slider according to the present invention, the optical lens being the objective lens is bonded to the sliding member at a predetermined position by the optical contact. That is, the, optical lens and sliding member are so bonded as to be united and optically uniform. Thus, the optical head can be manufactured easily and reduced in size.

Furthermore, with the method for manufacturing an optical head slider according to the present invention, since the optical lens being the objective lens is bonded to the sliding member, the bottom of the sliding member which faces the recording medium is made of one material. Thus, a flat surface free from micro-irregularities can be formed easily by polishing the bottom of the sliding member. So, the ABS can be formed with high accuracy. Furthermore, a large quantity of optical head sliders each of a stable quality can be manufactured, which can desirably reduce the manufacturing cost.

That is, according to the present invention, there is provided an optical head slider of a high reliability which can appropriately record/reproduce information signals to/from a recording medium even though the clearance from the signal recording surface of the recording medium becomes significantly small and of a configuration which can facilitate the manufacturing thereof.

Furthermore, according to the present invention, there is provided a method for manufacturing the optical head slider easily with high accuracy.

Furthermore, according to the present invention, there is provided a recording and/or reproducing apparatus having an optical head using the optical head slider.

What is claimed is:

1. An optical head slider comprising:
   a sliding member which is floated and slides on a recording medium at the time of recording/reproducing signals to/from the recording medium;
   an optical lens having a spherical surface and a flat surface, which is bonded to the sliding member; and
   means for generating a magnetic field, which is mounted to the bottom of the sliding member which faces the recording medium;
   wherein the sliding member is made of the same material as that of the optical lens, and the flat surface of the optical lens is bonded to the top surface of the sliding member so that a sum of a thickness of the optical lens and that of the sliding member becomes the radius of curvature of the spherical surface of the optical lens.

2. The optical head slider as set forth in claim 1, wherein the optical lens is bonded to the sliding member by the optical contact.

3. The optical head slider as set forth in claim 1, wherein a reinforcing block being provided with an opening into which the objective lens is fit is bonded to the sliding member.

4. The optical head slider as set forth in claim 1, wherein a thin-film which is made of a material harder than that of the sliding member is formed at the bottom of the sliding member which faces the recording medium.

5. The optical head slider as set forth in claim 1, wherein the inside diameter of the magnetic field generating means is smaller the outside diameter of the optical lens.

6. A recording and/or reproducing apparatus which has an optical head for recording/reproducing information signals to/from a recording medium,
   wherein the optical head has a head slider for scanning the rotated recording medium and an arm for supporting the head slider,
   the head slider has a sliding member which is floated and slides on the recording medium at the time of recording/reproducing signals to/from the recording medium,
   an optical lens which is bonded to the sliding member, and
   means for generating a magnetic field, which is mounted to the bottom of the sliding member which faces the recording medium, wherein the optical lens has a spherical surface and a flat surface, so that a sum of a thickness of the optical lens and that of the sliding member becomes the radius of curvature of the spherical surface of the optical lens.

* * * * *

UNITED STATES PATENT AND TRADEMARK OFFICE
CERTIFICATE OF CORRECTION

| | |
|---|---|
| PATENT NO. | : 6,762,978 B2 |
| DATED | : July 13, 2004 |
| INVENTOR(S) | : Akio Mishima et al. |

Page 1 of 1

It is certified that error appears in the above-identified patent and that said Letters Patent is hereby corrected as shown below:

Column 10,
Line 36, "smaller the" should read -- smaller than the --.

Signed and Sealed this

Second Day of November, 2004

JON W. DUDAS
*Director of the United States Patent and Trademark Office*